US007403301B2

(12) United States Patent
Schinner

(10) Patent No.: US 7,403,301 B2
(45) Date of Patent: Jul. 22, 2008

(54) SYSTEM AND METHOD FOR COLLECTING AND ANALYZING INFORMATION REGARDING USER DEVICES

(75) Inventor: Charles Edward Schinner, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 10/428,235

(22) Filed: May 2, 2003

(65) Prior Publication Data

US 2004/0218206 A1 Nov. 4, 2004

(51) Int. Cl.
*G06F 15/00* (2006.01)
*G06F 15/173* (2006.01)

(52) U.S. Cl. ...................................... 358/1.15; 709/224

(58) Field of Classification Search ................. 370/252, 370/328, 254, 338; 358/1.15, 474, 1.12; 709/202, 217, 223, 224, 231, 246; 382/115, 382/159; 455/450, 423; 340/907, 438
See application file for complete search history.

(56) References Cited

U.S. PATENT DOCUMENTS

| | | | | |
|---|---|---|---|---|
| 5,844,808 | A | 12/1998 | Konsmo et al. | |
| 6,529,590 | B1 | 3/2003 | Centers | |
| 6,965,928 | B1 * | 11/2005 | Cox et al. | 709/220 |
| 2002/0143924 | A1 | 10/2002 | Iga | |
| 2006/0015638 | A1 * | 1/2006 | Holzhauser et al. | 709/232 |

FOREIGN PATENT DOCUMENTS

| | | |
|---|---|---|
| JP | 8-77220 | 3/1996 |
| JP | A 8-77220 | 3/1996 |
| JP | 8-87423 | 4/1996 |
| JP | A 8-87423 | 4/1996 |
| JP | 10-510647 | 10/1998 |
| JP | A 10-510647 | 10/1998 |
| JP | 2001-222446 | 8/2001 |
| JP | A 2001-222446 | 8/2001 |
| JP | 2002-175200 | 6/2002 |
| JP | A 2002-175200 | 6/2002 |
| JP | 2002-297417 | 10/2002 |
| JP | A 2002-297417 | 10/2002 |
| JP | 2002-342124 | 11/2002 |
| JP | A 2002-342124 | 11/2002 |
| JP | 2003-503795 | 1/2003 |
| JP | A 2003-503795 | 1/2003 |
| JP | 2003-58395 | 2/2003 |
| JP | A 2003-58395 | 2/2003 |
| WO | WO 01/11507 A1 | 2/2001 |
| WO | WO 01/22748 A1 | 3/2001 |
| WO | WO 01/77954 A2 | 10/2001 |

* cited by examiner

*Primary Examiner*—Saeid Ebrahimi Dehkordy

(57) ABSTRACT

Disclosed are systems and methods for collecting device use information. In one embodiment, a system and a method pertain to recording on a user device information regarding at least one of the manner in which the device is used and the manner in which the device operates, and providing the recorded information to another device for analysis.

16 Claims, 6 Drawing Sheets

SYSTEM AND METHOD FOR COLLECTING AND ANALYZING INFORMATION REGARDING USER DEVICES

BACKGROUND

It is useful to device manufacturers, and third parties that provide accessories for the devices produced by those manufacturers, to obtain information as to the manner in which the devices are used if the devices deviate from an expected operation. The device use information identifies how users use their devices. With this information, the device manufacturer or other party can determine what features are most important/frequently used and therefore design future devices or accessories with those features in mind. For instance, in the case of a digital camera, it would be useful to obtain information as to which camera modes (e.g., automatic mode, macro mode, night mode, etc.) are used most frequently. In such a case, the features and modes of future cameras could be improved, enhanced, or expanded. In addition, such use information is valuable from a marketing standpoint in that accessories that are most useful to such use can be produced and offered to the user for sale. To cite an example, if a night mode in which the shutter speed is reduced to allow collection of more light is popular, manufacturers or other parties could, for instance, market steadying devices, such as tripods, to camera users. Moreover, such information would be useful from a research and development standpoint in that such efforts can be focused on the most valued features or modes.

Device operation information includes, for example, information as to what errors occurred with device operation. With such information, the manufacturer or other party could, for instance, develop improved mechanisms and/or firmware for future devices as well as create replacement parts and/or firmware patches that prevent such errors from occurring in existing devices.

Currently, such information is collected, if at all, by polling device users or noting their complaints when the user contacts technical service representatives. More useful would be a system and method for collecting such information without affirmative action on the part of the device user and manual recordation of that information.

SUMMARY OF THE DISCLOSURE

Disclosed are systems and methods for collecting device use information. In one embodiment, a system and a method pertain to recording on a user device information regarding at least one of the manner in which the device is used and the manner in which the device operates, and providing the recorded information to another device for analysis.

BRIEF DESCRIPTION OF THE DRAWINGS

The disclosed systems and methods can be better understood with reference to the following drawings. The components in the drawings are not necessarily to scale.

DETAILED DESCRIPTION

As described above, device use and/or operation information is typically not collected, unless perhaps by polling users or manually recording their complaints when technical service representatives are contacted. As is disclosed in the following, however, information pertaining to the way in which the device is used and how well the device operates can be recorded by the device and, if permitted by the user, automatically forwarded to a central location for collection and analysis. If desired, the information can be used to develop new devices, components, or code, as well as to market such items to existing or new customers.

Disclosed herein are embodiments of systems and methods that facilitate collection and analysis of information relevant to a user device. Although particular embodiments are disclosed, these embodiments are provided for purposes of example only to facilitate description of the disclosed systems and methods.

Figure 1:
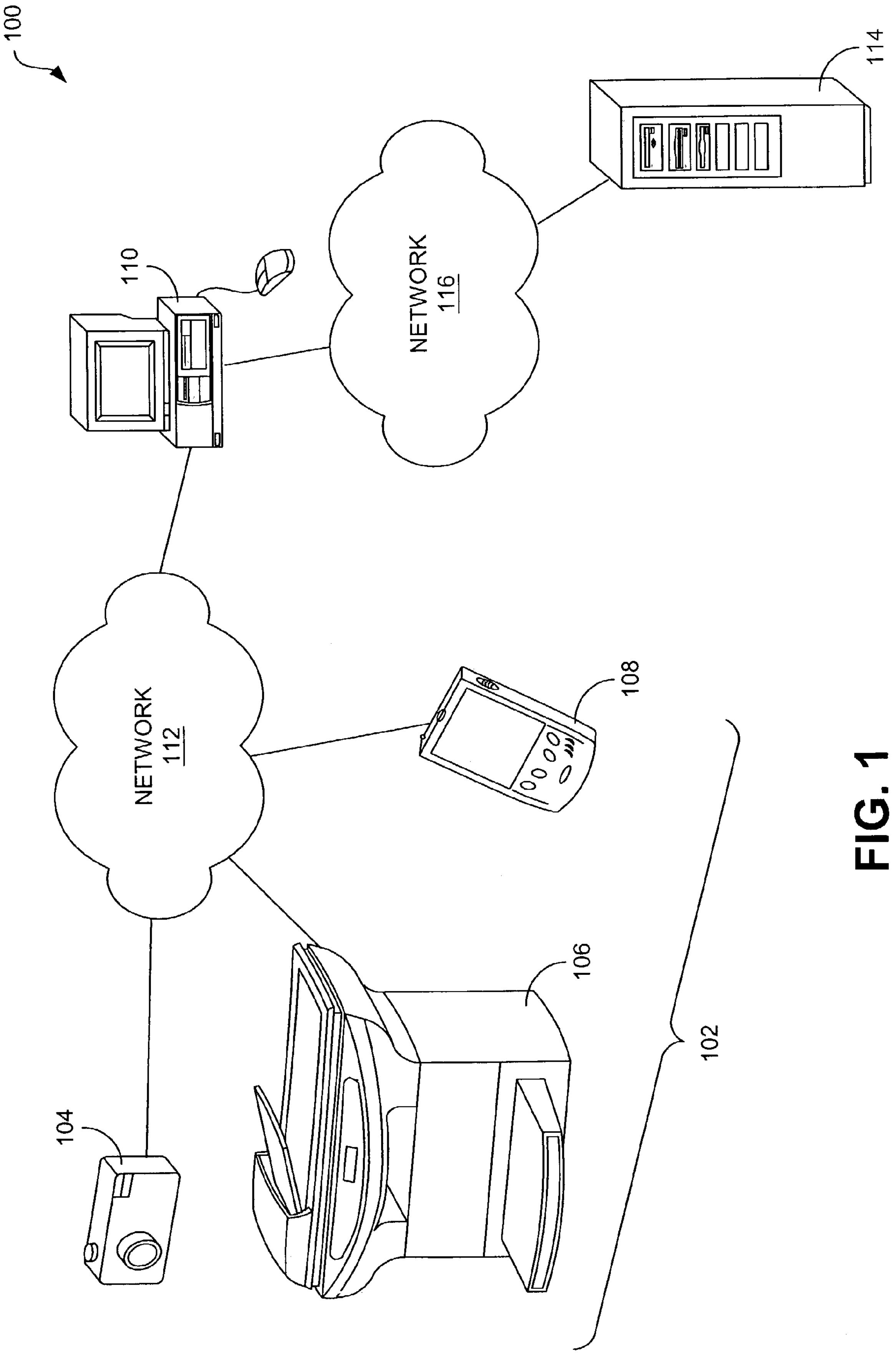
FIG. 1 is a schematic view of an embodiment of a system with which information as to use and/or operation of user devices can be collected and analyzed.

Referring now in more detail to the drawings, in which like numerals indicate corresponding parts throughout the several views, FIG. 1 illustrates an example system 100. As indicated in this figure, the system 100 generally comprises at least one user device 102 about which information is to be collected. In the example of FIG. 1, these user devices 102 include a digital camera 104, an imaging device 106, and a personal digital assistant (PDA) 108. Generally speaking, however, the user devices 102 comprise devices other than computers (e.g., PCs) that, previously, have lacked the ability to collect user and/or operation information. One manner of classifying the devices may be portable or handheld devices (cameras, PDAs, mobile telephones, etc.) and peripheral devices (printers, copiers, facsimile machines, scanners, multi-function peripheral devices (MFPs), etc.)

Also identified in FIG. 1 is a user computer 110 that, for instance, communicates to the user devices 102 via a network 112. In the example of FIG. 1, the user computer 110 is configured as a personal computer (PC). Although a PC is shown in FIG. 1 and has been identified herein, the user computer 110 could, alternatively, comprise another type of user computer including, for instance, a Macintosh™ computer, a notebook computer, or other computing device that communicates with the user devices 102 and can forward information provided by the devices to another computer.

The network 112 comprises either a single network or multiple sub-networks that are communicatively coupled to each other. By way of example, the network 112 is a local area network (LAN), such as a home or office network. Although communications between the user devices 102 and the user computer 110 are depicted as being supported only by the network 112, direct communications between the devices and the computer are alternatively or additionally possible. For example, direct wired connections (e.g., universal serial bus (USB)) may be used as can wireless (e.g., radio frequency (RF)) connections. Accordingly, it is noted that the manner in which the user devices 102 and the user computer communicate is not of great importance.

Further illustrated in FIG. 1 is a central computer 114 that communicates with the user computer via a network 116. The network 116 comprises a single network or multiple networks that are linked together to facilitate communication between the user computer 110 and the central computer 114. In some embodiments, the network 116 comprises one or more wide area networks (WANs) that form part of the Internet.

As with communications between the user devices 102 and the user computer 110, a network is not necessarily required to support communications between the user computer 110 and the central computer 114, and alternative modes of communication may be implemented.

The central computer 114 is operated by or on the behalf of a device manufacturer or other party that produces items (e.g., components, accessories, code) for the manufacturer's devices, and is used to collect and analyze information provided by the user devices 102. In one embodiment, the central computer 114 comprises a server computer. Although a single central computer 114 has been identified, this computer may represent multiple computers that, in concert, provide the desired collection and analysis functionalities.

As is described below, the system 100 can be used to deliver information collected by user devices 102 to the central computer 114. In the identified embodiment, the user computer 110 acts as an intermediary between the user devices 102 and the central computer 114. In alternative arrangements, however, information may be directly sent from the user devices 102 to the central computer 114 if the user devices and the central computer are equipped to support such communications. By way of example, information can be transmitted directly from the user devices 102 to the central computer 114 over an RF communication link.

Figure 2:
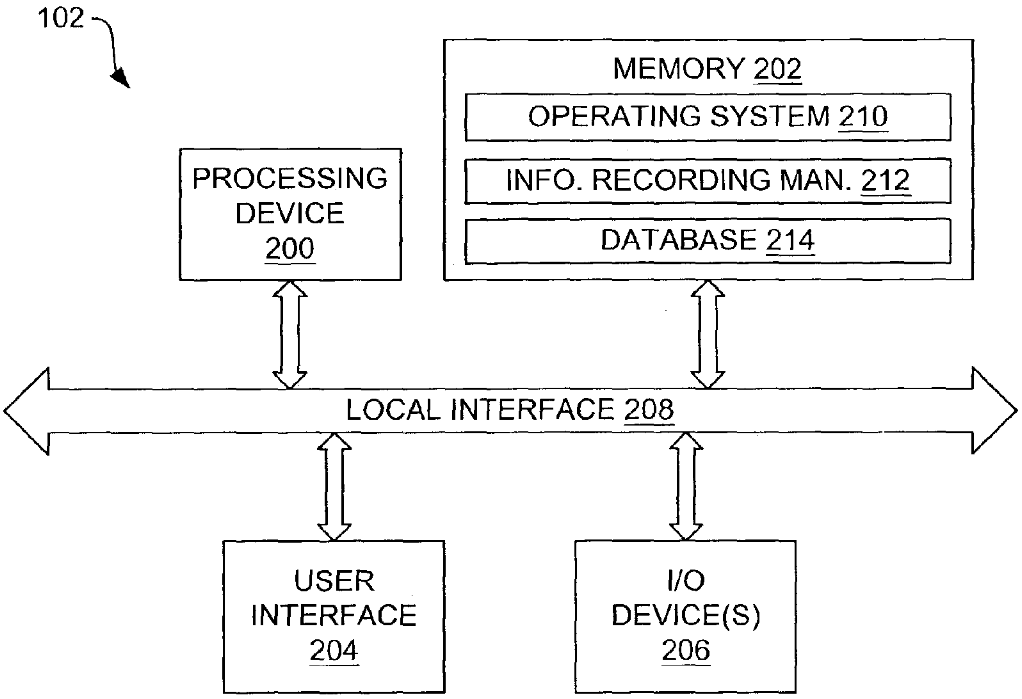
FIG. 2 is a block diagram of an embodiment of a user device shown in FIG. 1.

FIG. 2 is a block diagram illustrating an example architecture for the user devices 102 shown in FIG. 1. As indicated in FIG. 2, each user device 102 comprises a processing device 200, memory 202, a user interface 204, and at least one input/output (I/O) device 206. Each of these components is connected to a local interface 208 that, by way of example, comprises one or more internal buses.

The processing device 200 is adapted to execute commands stored in memory 202 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the user device 104. The memory 202 comprises any one or a combination of volatile memory elements (e.g., random access memory (RAM)) and nonvolatile memory elements (e.g., Flash memory, hard disk, etc.).

The user interface 204 comprises the tools with which the device settings can be changed and through which the user can communicate commands to the user device 102. By way of example, the user interface 204 comprises one or more function keys and/or buttons with which the operation of the user device 102 can be controlled, and a display, such as a liquid crystal display (LCD), with which visual information can be provided to the user and, where the display is touch-sensitive, commands can be entered.

The one or more I/O devices 206 facilitate communications with another device, such as the user computer 110, and may include one or more serial, parallel, small computer system interface (SCSI), universal serial bus (USB), IEEE 1394 (e.g., Firewire™), or other communication components. In some embodiments, the I/O devices 206 may, alternatively or in addition, include a modulator/demodulator (e.g., modem), wireless (e.g., RF) transceiver, or other such communication component.

The memory 202 includes various programs, in software and/or firmware, including an operating system 210 and an information recording manager 212. The operating system 210 contains the various commands used to control the general operation of the user device 102. The information recording manager 212 controls and manages the collection of various device information including, for example, use information that identifies the manner in which the user uses the device 102, and operation information that identifies the manner in which the device operates and, therefore, circumstances in which the device does not operate as intended (e.g., produces errors). Such information can, optionally, be stored in one or more databases 214 and analyzed by the recording manager 212. Examples of operation of the information recording manager 214 are described below in relation to FIGS. 5A and 5B.

Figure 3:
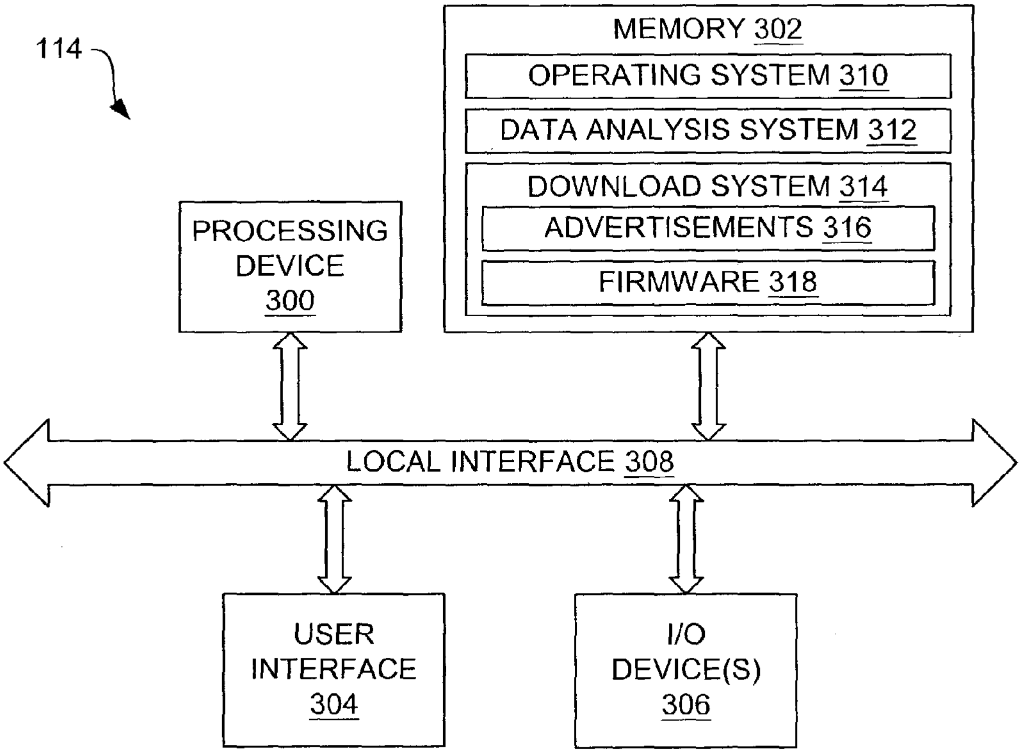
FIG. 3 is a block diagram of an embodiment of a central computer shown in FIG. 1.

FIG. 3 is a block diagram illustrating an example architecture for the central computer 114 shown in FIG. 1. As indicated in FIG. 3, the central computer 114 comprises a processing device 300, memory 302, a user interface 304, and at least one I/O device 306, each of which is connected to a local interface 308.

The processing device 300 can include a central processing unit (CPU) or an auxiliary processor among several processors associated with the central computer 114, or a semiconductor based microprocessor (in the form of a microchip). The memory 302 includes any one of or a combination of volatile memory elements (e.g., RAM) and nonvolatile memory elements (e.g., read only memory (ROM), hard disk, tape, etc.).

The user interface 304 comprises the components with which a user interacts with the central computer 114, such as a keyboard and mouse, and a device that provides visual information to the user, such as a cathode ray tube (CRT) or liquid crystal display (LCD) monitor.

With further reference to FIG. 3, the one or more I/O devices 306 are adapted to facilitate communications with the user computer 110 and/or the user devices 102 and may include one or more communication components such as a modulator/demodulator (e.g., modem), wireless (e.g., (RF)) transceiver, a telephonic interface, a bridge, a router, etc.

The memory 302 comprises various programs, in software and/or firmware, including an operating system 310, a data analysis system 312, and a download system 314. The operating system 310 controls the execution of other software and provides scheduling, input-output control, file and data management, memory management, and communication control and related services. The data analysis system 312 is configured to analyze information (i.e., data) received from the user devices 102, either directly or indirectly, for the purpose of making determinations as to production of items such as new user devices or components therefor, device accessories, and/or device firmware. The download system 314, when provided, is used to provide information to the user, either via the user device 102 or the user computer 110. Such information may comprise advertisements 316 and/or firmware 318. Examples of operation of the data analysis system 312 and the download system 314 are described below in relation to FIG. 6.

Various programs have been described herein. These programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, operation of the systems will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Generally speaking, systems are used to collect device use information and provide it to manufacturers and/or third party producers for the purpose of making determinations as to new items to be developed and/or existing items to offer and provide to users. An example method for collecting such information is described in relation to FIG. 4.

Figure 4:
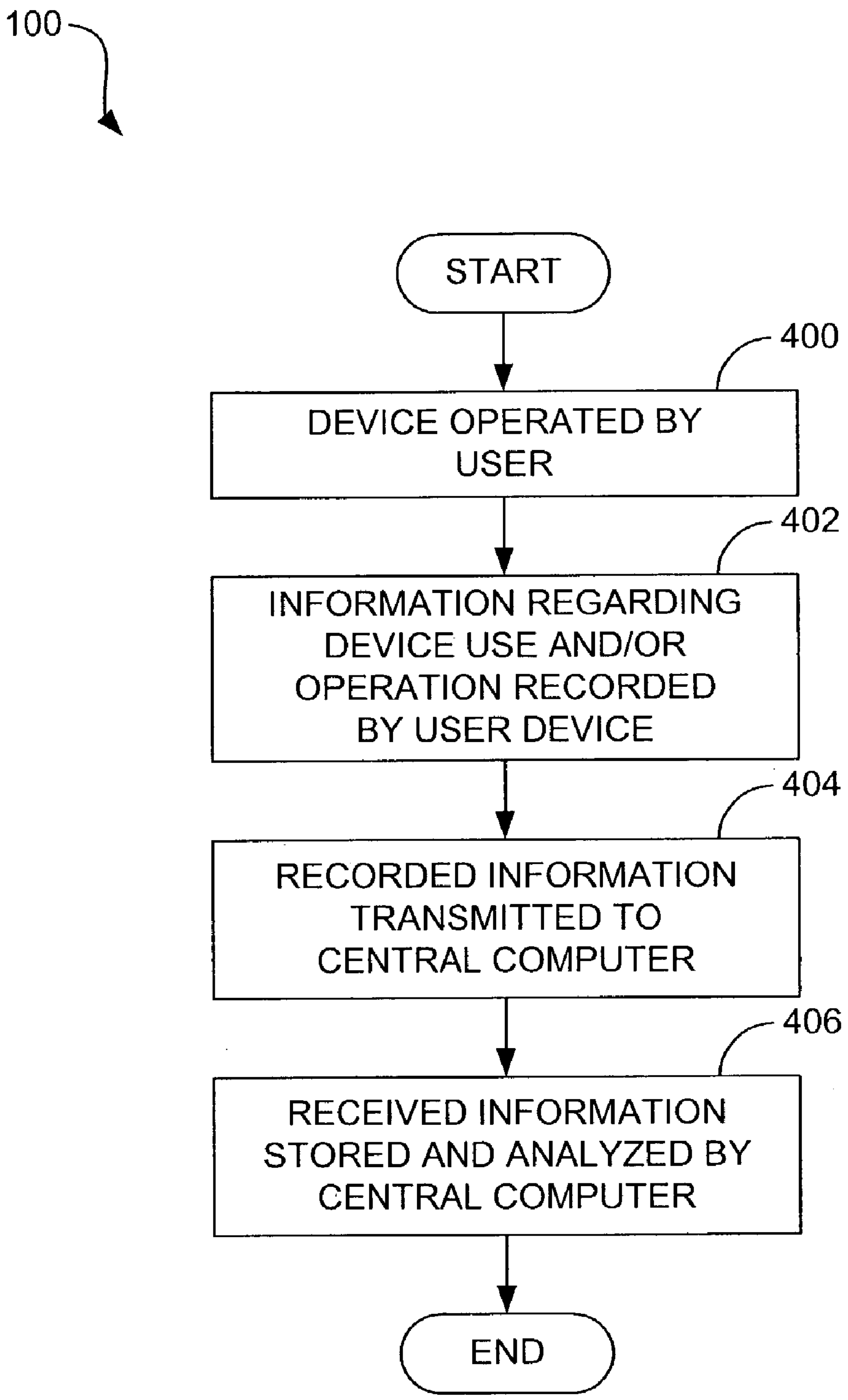
FIG. 4 is a flow diagram that illustrates an embodiment of a method for collecting and analyzing device use information.

Beginning with block 400 of FIG. 4, a user device is operated by the user. The nature of such operation depends upon the nature of the user device. By way of example, if the user device is a camera, operation may comprise capturing images or downloading already captured images to another device (e.g., user computer 110). If the user device is an imaging device (e.g., printer), operation may comprise printing, copying, scanning, or transmitting documents. If the user device is a PDA, operation may comprise displaying, storing, or transmitting contact or scheduling information.

With reference next to block 402, information regarding device use and/or operation is recorded by the device. In terms of device use, the information recorded pertains to the manner in which the device is used and may include information such as the settings- or modes in which the device is used and the device features that are used. For instance, the device use information may include an exposure setting that was used (camera), a number of copies that was requested (imaging device), a number of contacts that were transmitted (PDA), etc. In addition to that information, the information as to device use may further include information as to the conditions under which the device was used. For example, such information may include what time of day and/or the date the device was used, how long the device was powered during a given use session, and so forth.

As for information pertinent to device operation, recorded may be information that identifies how well the device performs a requested task. For example, in the case of an imaging device, that a paper jam occurred during printing may be recorded. In such a case, information as to the operating conditions under which the paper jam occurred (e.g., selected printing mode, size of the document, number of copies requested, time of day, etc.) may also be recorded. When operating in this manner, the device, in essence, generates an error log that comprises diagnostic information as to the operational failures that have occurred.

Irrespective of the particular nature of the information that is recorded, the information is transmitted to the central computer, as indicated in block 404. Optionally, this transmission will only occur if permitted by the user (e.g., in view of a selected device setting). If transmission is enabled, it can be direct, i.e. directly from the user device to the central computer, or indirect, i.e. from the user device to one or more intermediate devices (e.g., user computer 110) and then to the central computer. In addition to that information, auxiliary information may also be provided to the central computer. For example, information as to the user identity and contact information may be provided, assuming the user permits this information to be collected. In addition, information about the device, including the device type, model, and serial number can be provided. Furthermore, information as to when the information was transmitted and/or received may be recorded.

After the central computer receives the information, it is stored and analyzed by the computer, as indicated in block 406. The various received information can be stored in a database in which the information is organized according to one or more of several characteristics. For example, the information can be organized in accordance with a given user (i.e., owner) of the device that provided the information, in accordance with the type and model of the device, in accordance with the time frame in which the device was received, and combinations thereof.

Various analysis can be performed on the stored information (i.e., data). Generally speaking, the analysis is performed to determine how users use their devices and how well those devices perform the functions that they are designed to perform. Accordingly, the analysis can, for example, yield information as to the most popular modes of operation of the devices, the way in which the devices are typically used (e.g., when and how frequently), etc. Moreover, the analysis can yield information as to how often faults occur and under what operating conditions.

With such information, device manufacturers or others can, for instance, tailor new user devices to more effectively perform the most popular device tasks, and design these new devices so as to remedy the most frequently encountered faults. In addition, such manufacturers or other parties can determine in which items (e.g., accessories, functionalities (firmware)) the typical user would most likely be interested and, therefore, develop and market those items. Furthermore, manufacturers or other parties can determine what problems are being encountered and develop solutions to such problems. For example, firmware "patches" can be developed and distributed that remedy various firmware "glitches" that cause device faults.

Figure 5A:
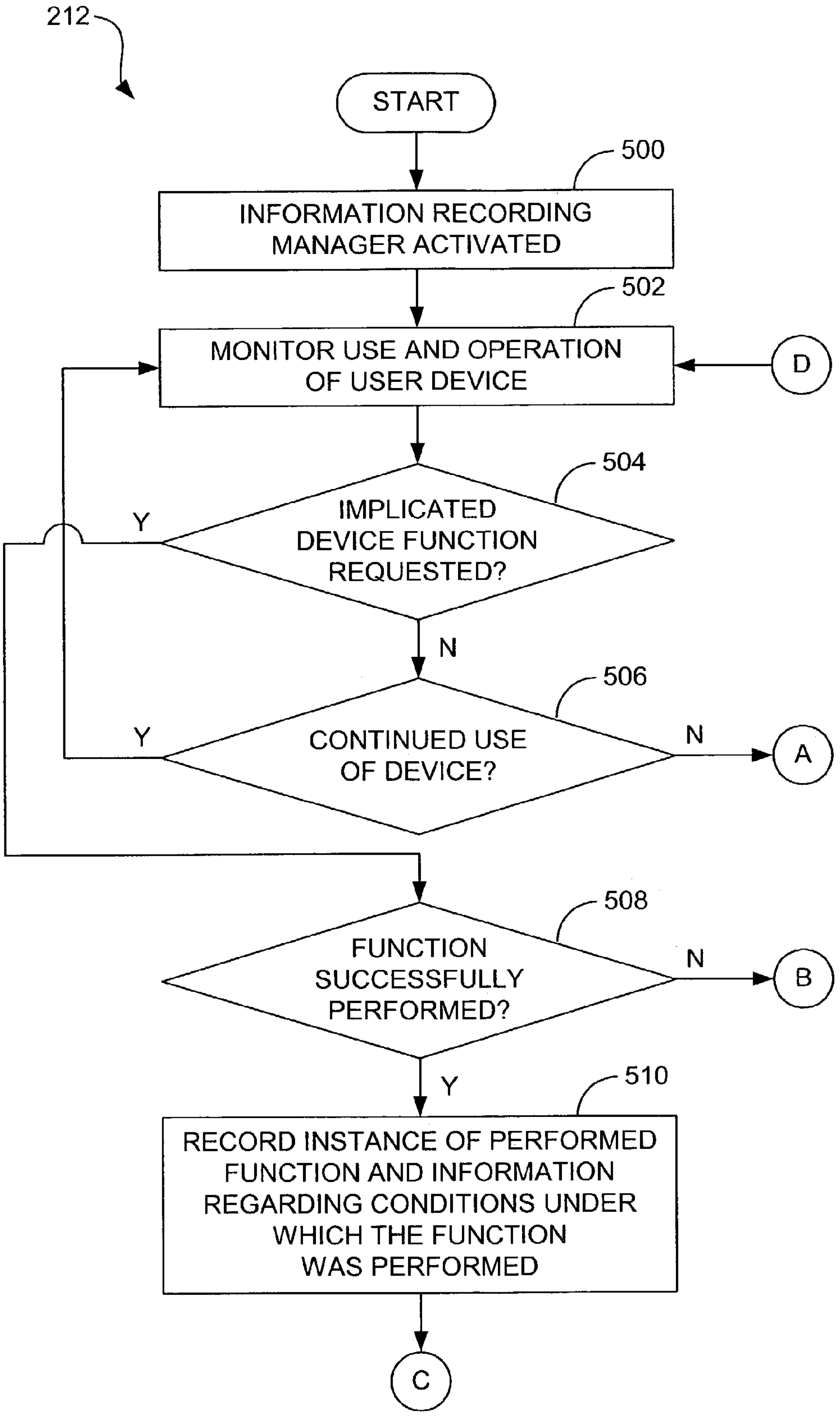
FIGS. 5A and 5B provide a flow diagram that illustrates an embodiment of operation of an information recording manager shown in FIG. 2.
Figure 5B:
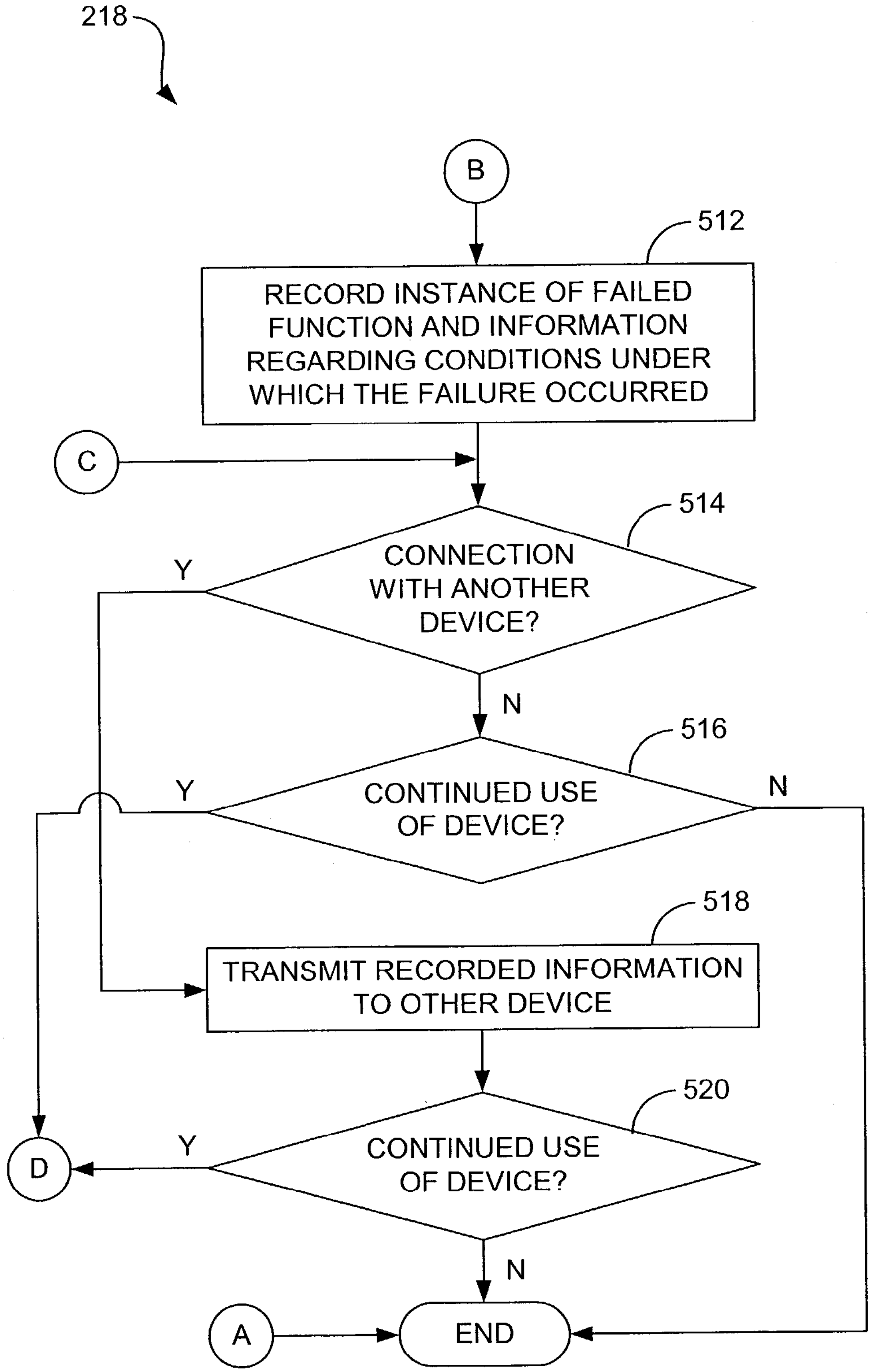

FIGS. 5A and 5B illustrate an example of operation of the information recording manager 212 of the user device in gathering information to be provided to another device, such as the central computer 114. Beginning with block 500 of FIG. 5A, the information recording manager 212 is activated. This activation may occur in response to the performance of an implicated device function, i.e. a function about which the information recording manager 212 is programmed to record information. Therefore, to cite examples, the manager 212 may activate when an image is captured (camera), a print job is received and processed (imaging device), or when a new contact is stored (PDA). In other embodiments, however, the information recording manager 212 is activated upon device power up.

Once the information recording manager 212 is activated, it monitors use and operation of the user device, as indicated in block 502. Therefore, in the situation in which manager activation occurs upon device power up, the manager 212 monitors the device to determine when an implicated function is or is about to be performed by the device. Accordingly, with reference to decision block 504, it is determined whether the user requests such an implicated function. As noted above with reference to FIG. 4, such functions (operations) may take many different forms and are highly dependent upon the nature of the particular user device.

Assuming the user device is a camera, example functions include capturing images, downloading captured images, downloading audio associated with one or more images, downloading additional visual effects (e.g., boarders, labels, etc.) associated with one or more images, etc. Assuming the user device is an imaging device examples include printing, copying, scanning, or transmitting documents, as well as collating, stapling, folding, or otherwise manipulating documents. Assuming the user device is a PDA, examples include displaying, storing, or transmitting contact or scheduling information, as well as receiving, modifying, or interpreting data.

If an implicated function is not requested, flow continues to decision block 506 at which it is determined whether there is continued use of the device. Typically, this determination is made with reference to whether the device has been powered off. If there is continued use, flow returns to block 502 and device monitoring in the manner described above continues. If device use ceases, however, flow for the session is terminated, as indicated in FIG. 5B.

Returning to decision block 504, if an implicated device function is requested, flow continues to decision block 508 at which it is determined whether the function is then successfully performed by the user device. For instance, it is determined whether images were successfully downloaded (camera), whether a document was printed without a jam occurring (imaging device), whether new contact information was received (PDA), or the like. If not, flow continues to block 512 of FIG. 5B described below.

If the function was successfully performed, however, flow continues down to block 510 at which the instance of the performed function (i.e., the fact that the function was performed) is recorded as is information regarding the conditions under which the function was performed. The conditions include information that is pertinent to the manner in which the user used the device and therefore comprises information such as the user selections (settings) that applied when the function was performed. Again, the nature of the selections typically depends upon the nature of the user device. Example selections may include, for instance, an operating mode in which the device is used, an exposure setting that was used (camera), a number of copies requested (imaging device), number of contacts transmitted (PDA), etc. Also included is information as to the conditions under which the function was performed such as what time of day or the date the device was used, how long the device was powered during a given use session, and so forth.

Referring back to decision block 508, if the requested function was not successfully performed, flow continues to block 512 of FIG. 5B at which the instance of the failed function is recorded along with information regarding the conditions under which the failure occurred. As used herein, "failure" includes any instance in which the device did not operate as it is designed to operate. Therefore, failure includes instances in which the ultimate outcome occurred, but did not occur in the intended manner (e.g., occurred too slowly). The information recorded as to the underlying operating conditions can comprise the same or similar information that is recorded when the function is successfully performed (block 510).

Irrespective whether a function was or was not successful, the information recording manager 212 has recorded information and it can then be determined whether a connection exists between the user device and another device, as indicated in decision block 514. As described above, this other device may comprise, for instance, the user computer 110. In such a case, connection may be detected when the user device is placed in a docking station used in association with the computer 110 and provided for purposes of downloading data to the computer and/or synchronizing the user device and the computer. In other cases, the user device and the user computer 110 may be always connected to each other. One example of such as situation is when the user device is a peripheral device such as an imaging device. In such a situation, the information recording manager 212 knows the existence of the connection. In situations in which the user device and the user computer 110 are not always connected, the connection determination can be made when communication between the user device and the other device (e.g., initial handshaking) is detected by the manager 212.

The other device may alternatively, or additionally, comprise the central computer 114. In that case, the existence of the connection is made by detecting communications between the user device and the central computer 114.

If no connection exists, flow continues to block 516 at which it is determined whether there is continued use of the user device. If not, flow for the session is terminated. If continued use is determined, however, flow returns to block 502 of FIG. 5A and device monitoring continues.

Returning to decision block 514, if a connection between the user device and another device exists, flow continues down to block 518 and recorded information is transmitted to the other device. Again, this information can be transmitted via a wired or wireless communication link. In either case, the transmission can be automatic. Specifically, in preferred arrangements, the recorded information is automatically and transparently forwarded to another device for purposes of conducting analysis on it. Therefore, the user need not affirmatively (manually) describe the way in which the user uses the device or convey the problems he or she is having with it. Assuming the information has been successfully transmitted, it is again determined whether there is continued use of the user device, as indicated in decision block 520. If not, flow for the session is terminated. If, however, there is continued use, flow returns to monitoring block 502 of FIG. 5A.

Figure 6:
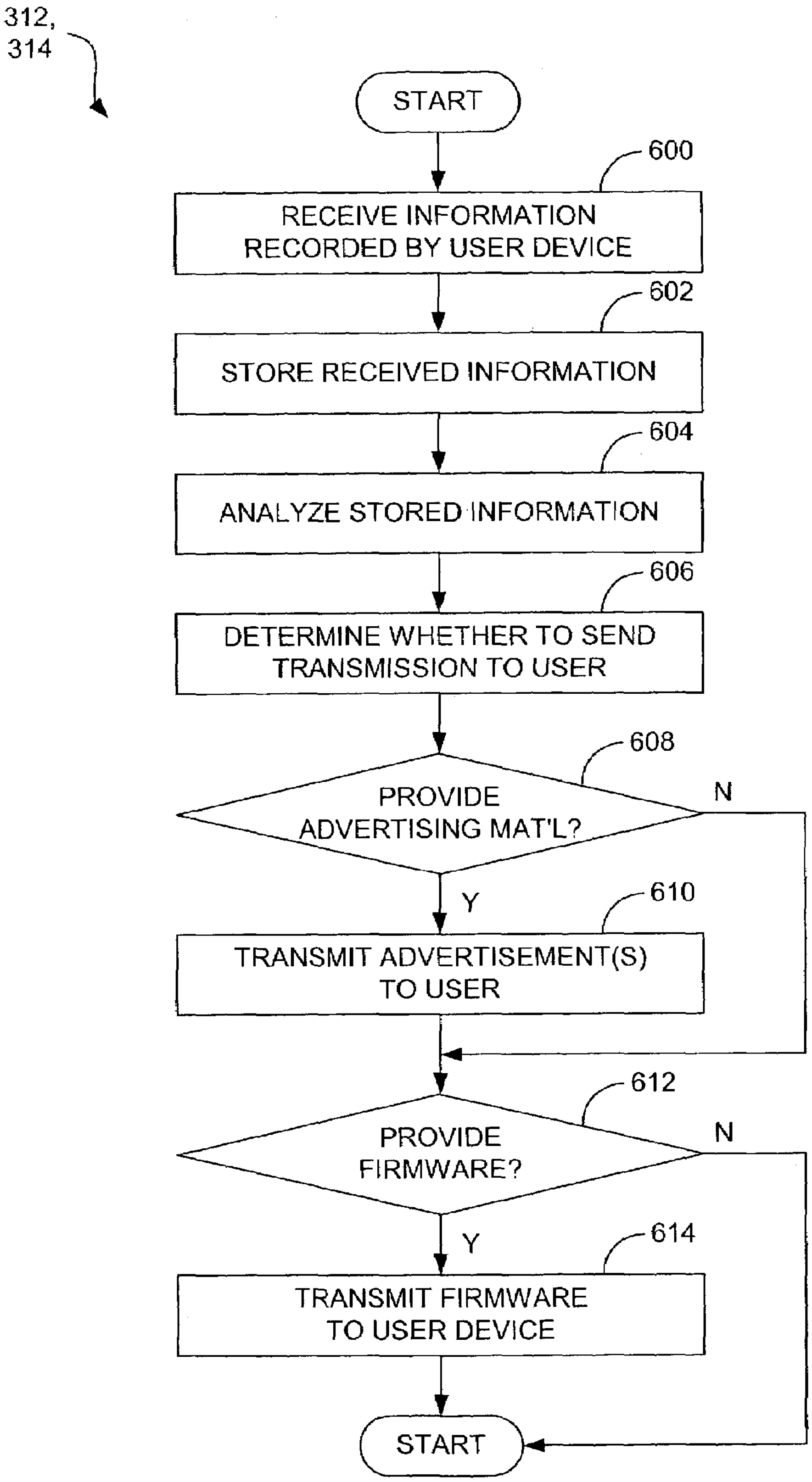
FIG. 6 is a flow diagram that illustrates an embodiment of operation of data analysis and download systems shown in FIG. 3.

With reference next to FIG. 6, illustrated is an example of operation of the data analysis and download systems 312 and 314 of the central computer. Beginning with block 600, the information recorded by the user device is received. As noted above, this information can have been received directly from the user device or can have been received from an intermediate device such as the user computer 110. In either case, the information is then stored to memory, as indicated in block 602. Storage may comprise storing the information in one or more databases that are used to make various business and technical determinations. As noted in the discussion of FIG. 4, information can be organized in accordance with one or more of several characteristics such as device user's identity, the type and model of the device, the time frame in which the device was received, and so forth. Alternatively or in addition, the database is configured to be searchable so that users or devices having common traits can be identified through an appropriate search. In any case, the stored information comprises statistics that, as is described below, can be used for various purposes.

Next, the stored information is analyzed, as indicated in block 604. As described in the foregoing, analysis of the culled information can provide the manufacturer, or other party that has received the information, with insight as to the manner in which users use their devices and an indication as to the how well those devices perform. Therefore, device manufacturers or other parties can use this information as a reference when designing and testing new user devices, determining what items to produce and market, developing solutions to existing problems, etc. In the example of FIG. 6, it is assumed that the information is to be used to market items to existing device users and/or provide firmware to those device users.

With reference to block 606, it is determined whether to provide advertising material to one or more users. This determination is made in reference to the information that has been stored and analyzed. For instance, if a manufacturer has a new flash unit it wishes to market, that manufacturer may determine to send advertising material about the flash unit to users who, from the stored information, appear to take a large number of flash pictures. To cite another example, if a third party manufacturer has a new document folding and stapling unit it wishes to market, that third party manufacturer may determine to send advertising material about the unit to users who, from the stored information, appear to conduct a large amount of post-printing processing of documents. To cite a further example, a manufacturer may determine to send advertising material about an illumination device (e.g., clip on light) to PDAs users who appear to frequently use their devices during nighttime hours. As can be appreciated from these examples, advertising material can be specifically targeted at particular users based upon the collected statistics.

With reference to decision block 608, if advertising material is not to be provided, flow continues to decision block 612 described below. If, on the other hand, advertising material is to be provided to one or more users, flow continues to block 610 at which advertisements are transmitted to at least one user. This transmission may comprise a direct transmission to the user device, assuming the device has the components necessary to present the advertisement to the user (e.g., display), or transmission to an intermediate device such as the user computer 110 (e.g., email, pop-up box, etc.). In either situation, the advertisements include at least one of an image, audio, and video.

With reference next to decision block 612, it can also be determined whether to provide firmware to one or more users. By way of example, this determination is made with reference to the device failure statistics stored on the central computer. In such a case, a firmware patch can be targeted at users that appear to have experienced a device failure that the patch can remedy. Alternatively, the firmware patch can be targeted to all users that own a certain type or model of device (or device having a given version of firmware), to remedy the problem as to all such devices. In addition to providing firmware patches, new and/or better firmware modules may be provided to the user, for instance in exchange for a fee. For example, if a new firmware version becomes available, users who possess the old version of the firmware may be targeted and provided with information (e.g., an advertisement) identifying the availability of the new firmware.

Before providing firmware, the user can be consulted as to whether he or she accepts the firmware. Therefore, a message notifying the user as to the availability of the firmware may first be transmitted to the user (either to the device directly or to the user computer). Assuming the user wishes to receive the firmware, or assuming that the user has configured the device to automatically accept such firmware, the firmware is transmitted to the user device, as indicated in block 614. This transmission can be directly to the device, or via an intermediate device (e.g., user computer 110).

What is claimed is:

1. A method for collecting device information, comprising:

an information recording manager stored on a user device that is a handheld or peripheral device, the information recording manager monitoring operation of the user device; and the information recording manager automatically recording in memory of the user device information regarding instances of successful performance of device functions and instances of unsuccessful performance of device functions such that records indicating the manner in which the user device is used by a user and device failures that have occurred on the user device are stored on the user device and a separate computer is not needed to analyze the user device to derive that information wherein recording in memory of the user device comprises recording in memory of a handheld device.

2. The method of claim 1, wherein recording in memory of the user device comprises recording in memory of at least one of a camera, a personal digital assistant, and a mobile telephone.

3. The method of claim 1, wherein recording in memory of the user device comprises recording in memory of a peripheral device.

4. The method of claim 3, wherein recording in memory of the user device comprises recording in memory of at least one of a printer, a copier, a facsimile machine, a scanner, and a multi-function peripheral device.

5. The method of claim 1, further comprising the information recording manager recording information about conditions under which the functions were performed.

6. The method of claim 5, wherein the information recording manager recording information about conditions under which the functions were performed comprises the information recording manager recording information about user-selected device settings that were active when the functions were performed.

7. The method of claim 1, further comprising the user device providing the recorded information to a separate computer.

8. The method of claim 7, wherein providing the recorded information comprises providing the information to a central computer operated by or on the behalf of a manufacturer of the device.

9. The method of claim 7, further comprising providing information about at least one of the user and the device to the separate computer.

10. The method of claim 7, further comprising the separate computer analyzing the recorded information.

11. The method of claim 10, further comprising providing advertising material to the user responsive to the analysis.

12. The method of claim 10, further comprising sending firmware to the user device in response to the analysis.

13. The method of claim 12, wherein sending firmware comprises sending a firmware patch to the user device.

14. A system for collecting and analyzing information pertinent to a device, the system comprising:

a handheld or peripheral user device including a processor and memory, the memory comprising an information recording manager that is configured to monitor operation of the user device and record in the memory of the user device information regarding instances of successful performance of device functions and instances of unsuccessful performance of device functions, such that records indicating the manner in which the user device is used by a user and device failures that have occurred on the user device are stored on the user device and a separate computer is not needed to analyze the user device to derive that information; and a separate computer including a processor and memory, the memory of the separate computer comprising a data analysis system that is configured to receive, store, and analyze the information recorded on the user device.

15. The system of claim 14, wherein the memory of the separate computer further stores a download system that is configured to download information to the user device in accordance with information obtained by analyzing the information recorded on the user device.

16. The system of claim 14, wherein the download system is configured to download at least one of advertisements and firmware to the user device.

* * * * *